(12) United States Patent     (10) Patent No.:   US 12,561,982 B2

Schulter et al.        (45) Date of Patent:    Feb. 24, 2026

(54) INFRASTRUCTURE ANALYSIS USING PANOPTIC SEGMENTATION

(71) Applicant: NEC Laboratories America, Inc., Princeton, NJ (US)

(72) Inventors: Samuel Schulter, Long Island City, NY (US); Sparsh Garg, San Jose, CA (US)

(73) Assignee: NEC Corporation, Tokyo (JP)

( * ) Notice: Subject to any disclaimer, the term of this patent is extended or adjusted under 35 U.S.C. 154(b) by 533 days.

(21) Appl. No.: 18/188,701

(22) Filed: Mar. 23, 2023

(65) Prior Publication Data

US 2023/0281999 A1     Sep. 7, 2023

Related U.S. Application Data

(63) Continuation-in-part of application No. 18/178,821, filed on Mar. 6, 2023.

(60) Provisional application No. 63/343,202, filed on May 18, 2022, provisional application No. 63/317,487, filed on Mar. 7, 2022.

(51) Int. Cl.
| | |
|---|---|
| *G06K 9/00* | (2022.01) |
| *G06V 10/26* | (2022.01) |
| *G06V 10/74* | (2022.01) |
| *G06V 10/774* | (2022.01) |
| *G06V 10/86* | (2022.01) |
| *G06V 20/54* | (2022.01) |
| *G06V 20/70* | (2022.01) |
| *G08G 1/09* | (2006.01) |
| *G08G 1/16* | (2006.01) |
| *G06V 10/82* | (2022.01) |

(52) U.S. Cl.
CPC .............. *G06V 20/54* (2022.01); *G06V 10/26* (2022.01); *G06V 10/761* (2022.01); *G06V 10/774* (2022.01); *G06V 10/86* (2022.01); *G06V 20/70* (2022.01); *G08G 1/09* (2013.01); *G08G 1/16* (2013.01); *G06V 10/82* (2022.01)

(58) Field of Classification Search
None
See application file for complete search history.

(56) References Cited

U.S. PATENT DOCUMENTS

| | | | | |
|---|---|---|---|---|
| 10,026,020 B2* | 7/2018 | Jin | .......................... | G06V 20/70 |
| 11,574,142 B2* | 2/2023 | Lin | ....................... | G06F 18/214 |
| 2021/0271707 A1* | 9/2021 | Lin | ....................... | G06V 30/274 |

OTHER PUBLICATIONS

Li et al., "Image-text embedding learning via visual and textual semantic reasoning", Jan. 2022 (Year: 2022).*

(Continued)

*Primary Examiner* — S J Park

(74) *Attorney, Agent, or Firm* — Vincent Duffy; Joseph Kolodka

(57) ABSTRACT

Methods and systems identifying road hazards include capturing an image of a road scene using a camera. The image is embedded using a segmentation model that includes an image branch having an image embedding layer that embeds images into a joint latent space and a text branch having a text embedding layer that embeds text into the joint latent space. A mask is generated for an object within the image using the segmentation model. A probability is determined that the object matches a road hazard using the segmentation mode. A signal is generated responsive to the probability to ameliorate a danger posed by the road hazard.

20 Claims, 10 Drawing Sheets

(56)            References Cited

OTHER PUBLICATIONS

Bevandic et al., "Multi-domain semantic segmentation with overlapping labels", In Proceedings of the IEEE/CVF Winter Conference on Applications of Computer Vision 2022, Jan. 2022, pp. 2615-2624.

Cheng et al., "Masked-attention Mask Transformer for Universal Image Segmentation", In Proceedings of the IEEE/CVF Conference on Computer Vision and Pattern Recognition 2022, Jun. 2022, pp. 1290-1299.

Lan et al., "Discobox: Weakly Supervised Instance Segmentation and Semantic Correspondence from Box Supervision", In Proceedings of the IEEE/CVF International Conference on Computer Vision 2021, Oct. 2021, pp. 3406-3416.

Li et al., "Language-Driven Semantic Segmentation", arXiv:2201.03546v2 [cs.CV], Apr. 3, 2022, pp. 1-13.

Wang et al., "FreeSOLO: Learning to Segment Objects without Annotations", InProceedings of the IEEE/CVF Conference on Computer Vision and Pattern Recognition 2022, Jun. 2022, pp. 14176-14186.

Xu et al., "A Simple Baseline for Open-Vocabulary Semantic Segmentation with Pre-trained Vision-language Model", arXiv:2112.14757v2 [cs.CV], Dec. 29, 2022, pp. 1-22.

* cited by examiner

Image segmentation neural network
700

Image segmentation neural network
800

INFRASTRUCTURE ANALYSIS USING PANOPTIC SEGMENTATION

RELATED APPLICATION INFORMATION

This application is a continuation-in-part of pending U.S. patent application Ser. No. 18/178,821, incorporated by reference herein in its entirety, which in turn claims priority to U.S. Patent Appl. No. 63/317,487, filed on Mar. 7, 2022, incorporated herein by reference in its entirety.

BACKGROUND

Technical Field

The present invention relates to image analysis and, more particularly, to panoptic segmentation of images.

Description of the Related Art

Panoptic segmentation is the task of assigning each pixel in ja given image to a semantic category. Ground truth annotations for panoptic segmentation, particularly at large scales, can be costly as human intervention is needed. While public datasets exist, it is not straightforward to combine such datasets, because the numbers and types of categories that are annotated may vary from dataset to dataset.

SUMMARY

A computer-implemented method for identifying road hazards includes capturing an image of a road scene using a camera. The image is embedded using a segmentation model that includes an image branch having an image embedding layer that embeds images into a joint latent space and a text branch having a text embedding layer that embeds text into the joint latent space. A mask is generated for an object within the image using the segmentation model. A probability is determined that the object matches a road hazard using the segmentation mode. A signal is generated responsive to the probability to ameliorate a danger posed by the road hazard.

A system for identifying road hazards includes a hardware processor and a memory that stores a computer program. When executed by the hardware processor, the computer program causes the hardware processor to capture an image of a road scene using a camera, embed the image using a segmentation model that includes an image branch having an image embedding layer that embeds images into a joint latent space and a text branch having a text embedding layer that embeds text into the joint latent space, generate a mask for an object within the image using the segmentation model, determine a probability that the object matches a road hazard using the segmentation mode, and generate a signal responsive to the probability to ameliorate a danger posed by the road hazard.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Panoptic image separation can be used for such tasks as improving the safety of operations at traffic intersections. For an intersection that is monitored by video cameras, rich semantic outputs of the panoptic segmentation for both traffic participants and scene elements provides a detailed understanding of the scene. This information can be used to make decisions regarding operation of safety signaling devices, provide traffic alerts for vehicles and pedestrians, and public safety alerts to local authorities, such as municipal authorities.

To obtain a robust model for panoptic image segmentation, the model may be trained using multiple datasets with different forms of annotation. Additionally, object detection datasets may be used, though such datasets may only provide bounding box ground truth information for countable object categories. Using larger datasets improves segmentation accuracy and improves robustness and generalization.

To this end, public segmentation datasets may be employed. These datasets may include annotations that indicate a semantic category for each pixel in their constituent images as well as instance IDs for categories that are countable. Thus, a given pixel may be in the category of "car," and may further have an instance ID identifying which of the cars in the image it relates to. When an unlabeled image is input to a trained panoptic segmentation model, the model generates labels for each pixel of the input image to output a segmented image. Segmented images may be used in a variety of applications, such as robotics, self-driving vehicles, augmented reality, and assisted mobility.

To that end, a merging model may be implemented using a neural network that uses an embedding layer to map input image features into a joint vision and language embedding space. In the joint embedding space, the visual and textual representation of a given object (e.g., a set of pixels that show a car and the textual string "car") map to vectors that are close to one another. Thus, the embedded representations of each are similar to one another according to an appropriate metric, such as a distance metric. For example, the cosine distance may be used as a distance metric to determine the similarity of two representations. Multiple distinct datasets may then be combined, even if they use different category names, without manual unification of the annotation schemas. Additionally, novel categories that were not annotated during training can be recognized.

A loss function is defined to integrate object detection datasets into the segmentation model training process, with weaker forms of annotation than would be used for panoptic segmentation datasets. This can increase the label space and the robustness of the trained segmentation model.

Figure 1:
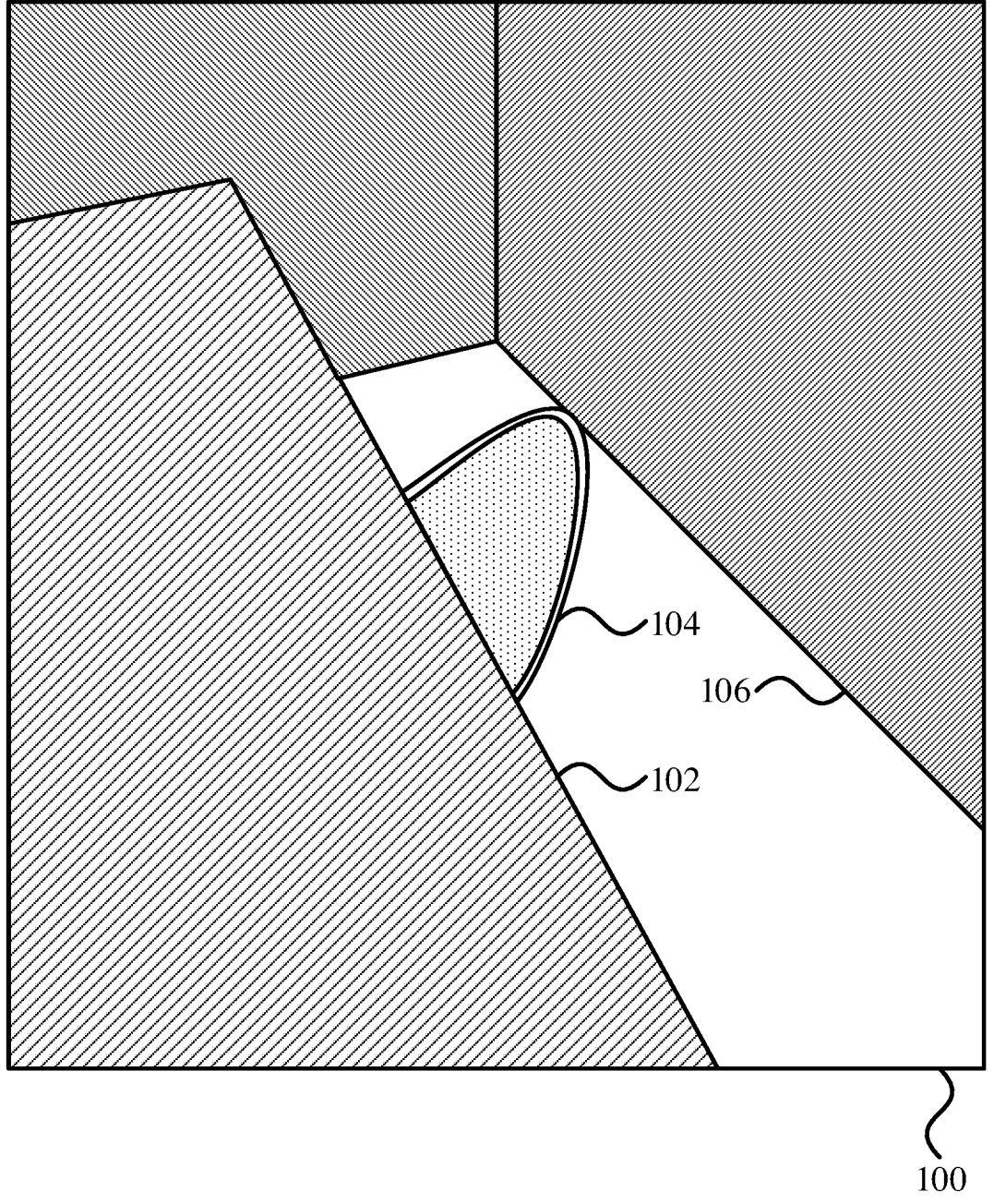
FIG. 1 is a diagram of an interior space as seen by an automated agent, in accordance with an embodiment of the present invention.

Referring now in detail to the figures in which like numerals represent the same or similar elements and initially to FIG. 1, an exemplary image 100 from an image segmentation dataset is shown. The image 100 includes a view of an interior scene, with a table 102 partially occluding the view of a chair 104. Also shown are objects like walls 106 and the floor, which may be partially occluded by foreground objects.

Every pixel in the image may be labeled according to a given semantic category. Thus, the pixels that are part of the chair 104 may each be labeled with the semantic category of "chair." The pixels of each wall 106 may similarly be labeled with the semantic category of "wall," and may further have an instance ID that distinguishes the two walls from one another.

The same image 100, or one that includes a similar interior scene, may be annotated differently in different segmentation dataset. For example, in such a dataset, the chair 104 and the table 102 may both have the semantic category of "furniture," with differing instance IDs to distinguish the two pieces of furniture from one another. To merge such datasets, objects and their labels may both be embedded in a shared latent space, so that semantic correspondences can be determined for use in training of a segmentation model.

Figure 2:
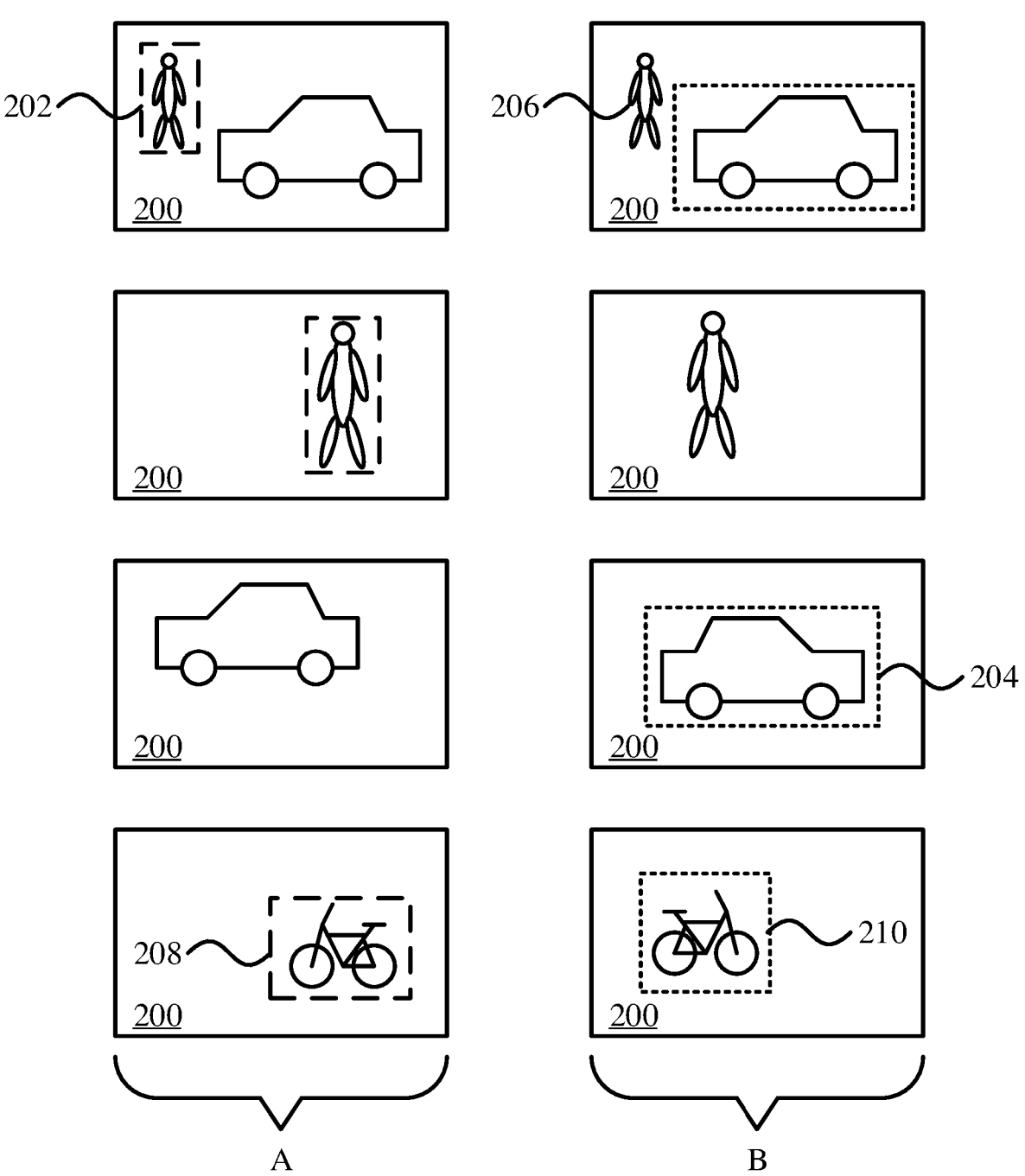
FIG. 2 is a diagram contrasting different image datasets, in accordance with an embodiment of the present invention.

Referring now to FIG. 2, a comparison of images from two object detection datasets is shown. Such datasets may be annotated with bounding boxes for particular objects, but may not identify particular categories for each pixel of the image. Furthermore, the object datasets may not label every object that would be relevant to panoptic image segmentation. In this example, a first dataset, labeled A, is annotated with people, while the second dataset, labeled B, is annotated with automobiles. Each dataset includes multiple images 200, each of which may include zero, one, or more objects of the relevant class.

Dataset A indicates the presence of a person with a bounding box 202. Dataset B indicates the presence of an automobile with a bounding box 204. Datasets A and B both label bicycles, as 208 and 210 respectively. However, each dataset includes images 200 that have objects from the other dataset's classes which are not labeled. Thus, for example, images 200 from dataset B may include people 206 who are not annotated with a bounding box. If the images 200 from dataset B are included in image segmentation training dataset, there may be at least some images 200 in the combined dataset which include unlabeled people as part of the background of the image.

While object detection datasets can provide a large amount of useful information for an image segmentation task, the relative incompleteness of their annotations may be taken into account. A loss function that is used when training the panoptic segmentation model on object detection datasets weakens the contribution of such images to account for the possibility that they are missing relevant information.

A panoptic segmentation model takes an image I as input and extracts multi-scale features using a neural network. A transformer encoder-decoder may be used to predict a set of N masks $m_i \in [0,1]^{H \times W}$ along with probabilities $p_i \in \mathbb{R}^{C+1}$ where H and W are the image dimensions and C is the number of categories. This model may be suitable for semantic, instance, and panoptic segmentation. The training objective for a given image may be implemented as:

$$\mathcal{L} = \sum_{i=1}^{N} l_{CE}\left(p_i, p_{\sigma(i)}^{gt}\right) + \left[p_{\sigma(i)}^{gt} \neq \emptyset\right] l_{BCE}\left(m_i, m_{\sigma(i)}^{gt}\right)$$

where $l_{BCE}$ is the binary cross-entropy loss, $\{p, m\}^{gt}$ are category and masks ground truths, [•] is an indicator function, and $p^{gt}=\emptyset$ indicates the "no-object" class. The function $\sigma(i)$ is the result of a matching process between predicted masks and ground truth masks/boxes. The matching process may be represented as a combinatorial optimization problem, such as the assignment problem, and can be solved with a linear program.

The model takes as an input an image and predicts N masks. There are M ground truth masks. For each predicted mask, the correct shape of the mask and its corresponding category are determined. Each prediction is therefore matched to the ground truth. If there are more predictions than ground truths, some predictions may not be matched. Unmatched predictions may not participate in the loss for the mask, but may instead have the classification of "background," representing no object. This matching result may be defined with a, for example indexing from prediction indices 1 . . . N to ground truth indices 1 . . . M. Thus, $\sigma(i)$ is the index for prediction i in the range [1, N] and its value is an index in the range [1, M]. The function $\sigma(i)$ may be represented as an array that is indexed by i, with each element pointing to a ground truth index [1, M] or to a 0 if no prediction is matched. No ground truth index is used twice.

The quantity $\sigma(i)$ for a prediction i represents the match between the prediction generated by the model and the ground truth label from the image's respective training dataset. To find a, a cost matrix $C \in \mathbb{R}^{N \times M}$ may be determined to assign a cost value for matching prediction i with ground truth j. The cost value is low if the predicted and ground truth categories match. The second and third terms of the cost function focus on the localization of the predicted mask. Given a predicted mask, a subset of points is first sampled via importance sampling, based on the prediction uncertainty. The ground truth for the same points is gathered and two losses are determined: the binary cross-entropy loss and the dice loss. When training from bounding a dataset with bounding boxes, the second and third terms are replaced with the cost $C_{ij}^{mb}$ described in greater detail below.

To train from multiple datasets and impose a classification loss, the different label spaces may be resolved. A joint vision-and-language embedding includes an image-encoder network and a text-encoder network, which both project their respective inputs into an embedding space and are trained using a contrastive loss.

Instead of directly predicting a probability distribution $p_i$ for an image, the embedding model predicts an embedding vector $e_i^I \in \mathbb{R}^d$ for each query i. To obtain a representation of category names in the same embedding space as the images, the text-encoder projects class-specific text prompts into a text embedding $e_c^T$ for each category c. The class probability $p_i$ may then be defined as:

$$p_i = Softmax\left(\frac{1}{\tau} \cdot [\langle e_i^I, e_1^T \rangle, \langle e_i^I, e_2^T \rangle, \dots, \langle e_i^I, e_C^T \rangle, \langle e_i^I, e_\emptyset^T \rangle]\right)$$

where $\langle \bullet, \bullet \rangle$ denotes the dot product and $e_\emptyset^T$ is an all-zero vector representing the "no-object" class. The temperature i may be set to an appropriate value, such as 0.01, to set the shape of the distribution $p_i$. As the value of $\tau$ approaches zero, the SoftMax function approaches a Max function, so that large values of $\tau$ create a more uniform distribution. The embedding vectors $e^{\{I,T\}}$ are $\ell_2$-normalized. The class probability $p_i$ can be used in the loss function $\mathcal{L}$ for training. The indices T and/indicate "text" and "image," so that el represents an embedding vector coming from an image and $e^T$ represents an embedding vector coming from text. The term d is the dimensionality of the embedding vectors.

The text embeddings $e_c^T$ for the class c may be determined based on the input prompt for the text-encoder. Manually defined prompts may be evaluated, for example including the class token "<CLS>". Such a prompt may be, "A photo of <CLS>," or just, "<CLS>," but the prompt may be learned as, "<START><L₁> . . . <L_m><CLS><L_M><END>," where "<L_m>" are learnable tokens and M+1 is the number of tokens in the prompt, including the class token.

When training the segmentation model, an image I is sampled from one of K datasets $D_k$, where $k \in \{1, \dots, K\}$, which also defines the labelspace $\mathcal{L}$ k. Text embeddings $e_c^T$ are computed for $c \in \mathcal{L}$ k—the embeddings may be predetermined if prompts are not learned. The predefined embedding space of the vision-and-language model handles the different label spaces, where different categories having different names corresponding to respective locations in the embedding space. Different names of the same semantic category, such as "sofa" and "couch," will be located close to one another due to semantic training on large-scale natural image-text pairs.

Image augmentation may be performed, after which the model makes N predictions, each with a mask $m_i$ and corresponding object embedding Together with the ground truth and the computed matching a, the classification and mask losses may be determined using the loss function $\mathcal{L}$.

Using text embeddings enables the model to output probabilities for arbitrary labelscapes defined by natural text and thus to operate in an open-vocabulary setting, where the model is evaluated on categories that may not have been annotated during training.

To improve generalization, knowledge from the image-encoder may be distilled into the embedding space. An embedding vector $e_i^D$ is obtained from the image-encoder for eachc predicted mask $m_i$. A dense per-pixel prediction may be generated and all embeddings within the mask $m_i$ may be averaged to obtain $e_i^D$ via pooling. An $\ell_1$ loss between $e_i^D$ and $e_i^I$ may be added.

Training the model with missing annotations can bias the predicted probabilities $p_i$ toward the "no-object" category, particularly for unseen categories, because they may appear in the training images without annotation and may therefore be assigned the "no-object" class. To mitigate this problem, a panoptic inference algorithm may be used to turn potentially overlapping masks $m_i$ into one coherent panoptic segmentation output by ignoring the "no-object" probability when filtering queries. In addition, the scores of unseen categories may be increased via the function $p=p^\gamma$, with $\gamma < 1.0$. This rescoring improves the results for a wide range of values of the selectable parameter $\gamma$.

When considering object detection datasets, which include bounding box annotations, a cost function is used between predicted masks $m_i$ and ground truth boxes $b_j$ for the matching a in the loss function. A pair-wise cost may be defined as:

$$C_{ij}^{mb} = 1.0 - \frac{\kappa^{in}}{|b_j|} + \frac{\kappa^{out}}{|m_i|}$$

where $|m_i|$ and $|b_j|$ define the size of the mask and the box, respectively, while $\kappa_{in}$ and $\kappa^{out}$ define the number of pixels of the mask $m_i$ in side and outside the ground truth box $b_j$. This cost replaces mask-to-mask costs used to compute a when training from bounding box annotations.

After obtaining $\sigma$, a loss function may be defined between predicted masks and ground truth boxes. The classification loss can remain unchanged as detection ground truth comes with semantic classes. The ground truth bounding box provides some constraints on the predicted mask $m_i$. In general, the observation that pixels of the predicted mask can only appear inside the ground truth box and the mask needs to touch all four boundaries can be leveraged. Pixels may be selected at random inside the bounding box, and may be assigned positive and negative labels depending on their prediction scores, which may range between zero and one. If above a threshold value (e.g., greater than 0.8), the pixel may be treated as positive to indicate that it belongs to the mass. If below a threshold (e.g., less than 0.2), the pixel may be treated as negative to indicate that it does not belong to the mask. If between these thresholds, the pixel may be ignored in the loss function. The distillation loss from the image-decoder can also be applied on object detection data.

Figure 3:
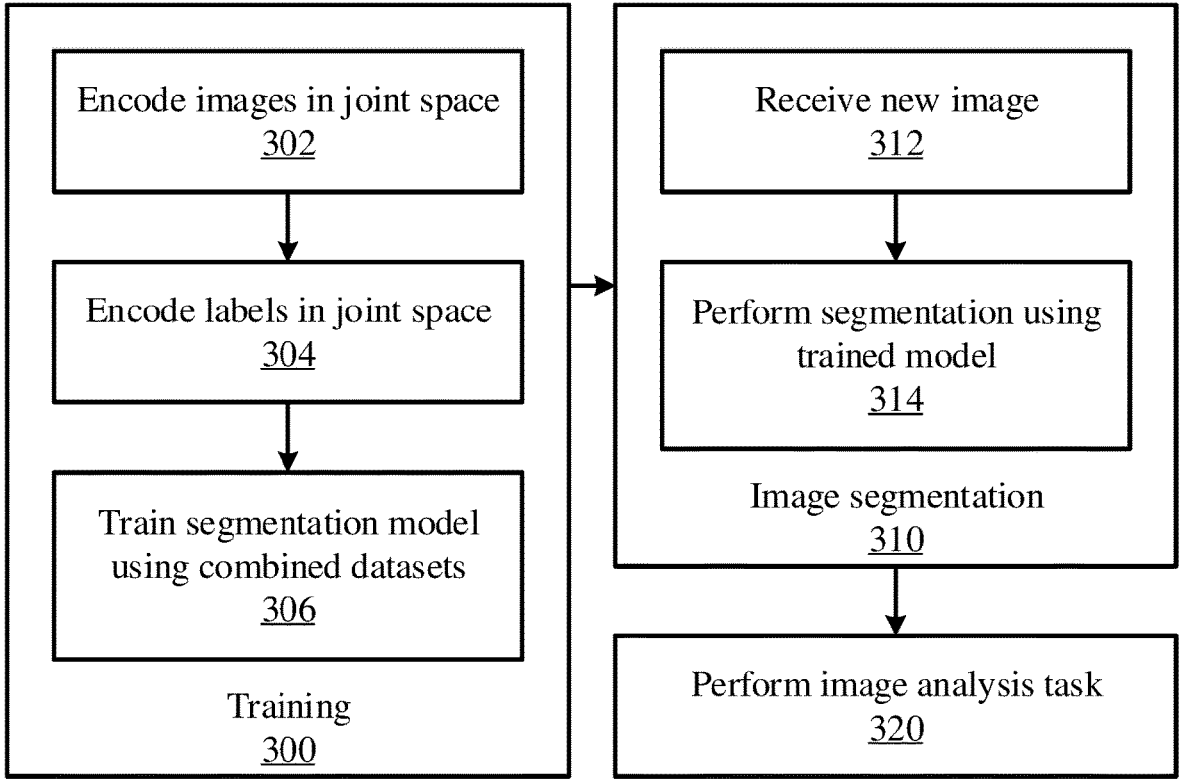
FIG. 3 is a block/flow diagram of a method for training and using an image segmentation model that encodes images and text labels in a joint latent space, in accordance with an embodiment of the present invention.

Referring now to FIG. 3, a process for training and using an image segmentation model is shown. In a training phase 300, multiple datasets may be used to train a panoptic segmentation model, for example including panoptic segmentation datasets with inconsistent labelspaces as well as object detection datasets that may not have class labels for every pixel. The training phase 300 may make use of a loss function that considers the type of dataset from which a given training image is drawn, for example weighting contributions from object detection datasets differently compared to those from panoptic segmentation datasets.

During operation, image segmentation 310 may be performed on newly acquired images using a trained panoptic segmentation model. Image segmentation 310 outputs a set of labels for each pixel in the newly acquired image, for example generating an object class and instance ID (if appropriate) for each pixel. An image analysis task 320 may be performed using the segmented image, for example using the detected objects within the image to navigate within an interior environment or to operate a self-driving automobile.

Block 302 encodes images from the training datasets in a joint space that similarly represents words and images. Encoding 302 may include adjustment, cropping, or resizing of the images to appropriate dimensions for the model. Block 304 encodes the labels for the training datasets in the same joint space, so that similar labels from different datasets will be unified in their representations for the model. Block 306 trains the panoptic segmentation model using the combined datasets and the loss function. During training, differences between the model's prediction for a given image and the ground truth label representations are used in the loss function to determine how weights in the model should be adjusted for a next training iteration.

After the panoptic segmentation model is trained, the model may be distributed to one or more operational sites. During operation, block 312 receives a new image, for example from a camera on a vehicle. The image may be adjusted, cropped, or resized to reflect an appropriate input to the trained panoptic segmentation model. The model then performs segmentation on the input image in block 314, generating a label for each pixel in the input image, as well as an instance ID if appropriate.

As noted above, block 302 may resize the input image to a specific input size (e.g., 384×384 pixels). Block 302 may then apply a visual backbone, such as a residual neural network that returns a feature map of size $F \in \mathbb{R}^{D \times H \times W}$ where D is the dimensionality and H×W is the spatial extend (e.g., about ⅓₂ of the input image size). To generate the final image embedding, a set of multi-layer perceptrons (MLPs) may be used for determining value embeddings and computing the final output. The outputs of the MLPs are reshaped into 1×1 convolution layers. This two-layer network is applied on top of the feature map F and returns per-pixel embeddings.

With the predicted masks $m_i$, mask-wise pooling may be performed on the dense embeddings to get a per-query (per-mask) embedding vector that can be used for distillation. For example, all embeddings for pixels with $m_i > 0.5$ may be averaged.

Figure 4:
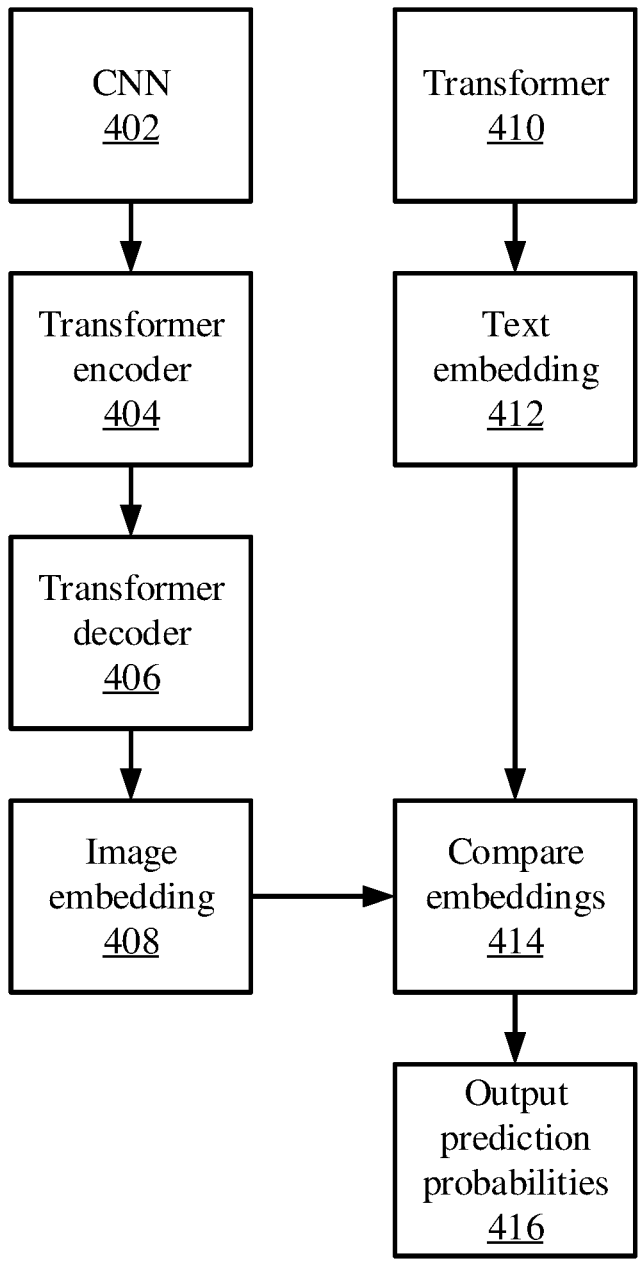
FIG. 4 is a block diagram of an exemplary image segmentation model having separate branches for embedding images and text inputs, in accordance with an embodiment of the present invention.

Referring now to FIG. 4, a block diagram of a neural network model is shown. The model has two branches, one accepting image inputs and the other accepting associated textual label inputs. A convolutional neural network stage 402 accepts the image as input and generates a feature map having dimensions H×W, corresponding to the dimensions of the input image. A transformer encoder 404 processes the feature map to generate tokens for the pixels of the image. A transformer decoder 406 then decodes the tokens to generate features for the image. Block 408 embeds these pixels according to the different masks that the model is sensitive to. The result is a set of embeddings corresponding to the pixels of the image.

In the text branch, a transformer neural network 410 processes the input textual labels. Block 412 embeds the output of the transformer into the same latent space as the images. Block 414 then compares the image embeddings and the textual embeddings for a given image, for example using a cosine similarity between the respective vectors. Block 416 can then determine probabilities for each prediction and each input text.

Figure 5:
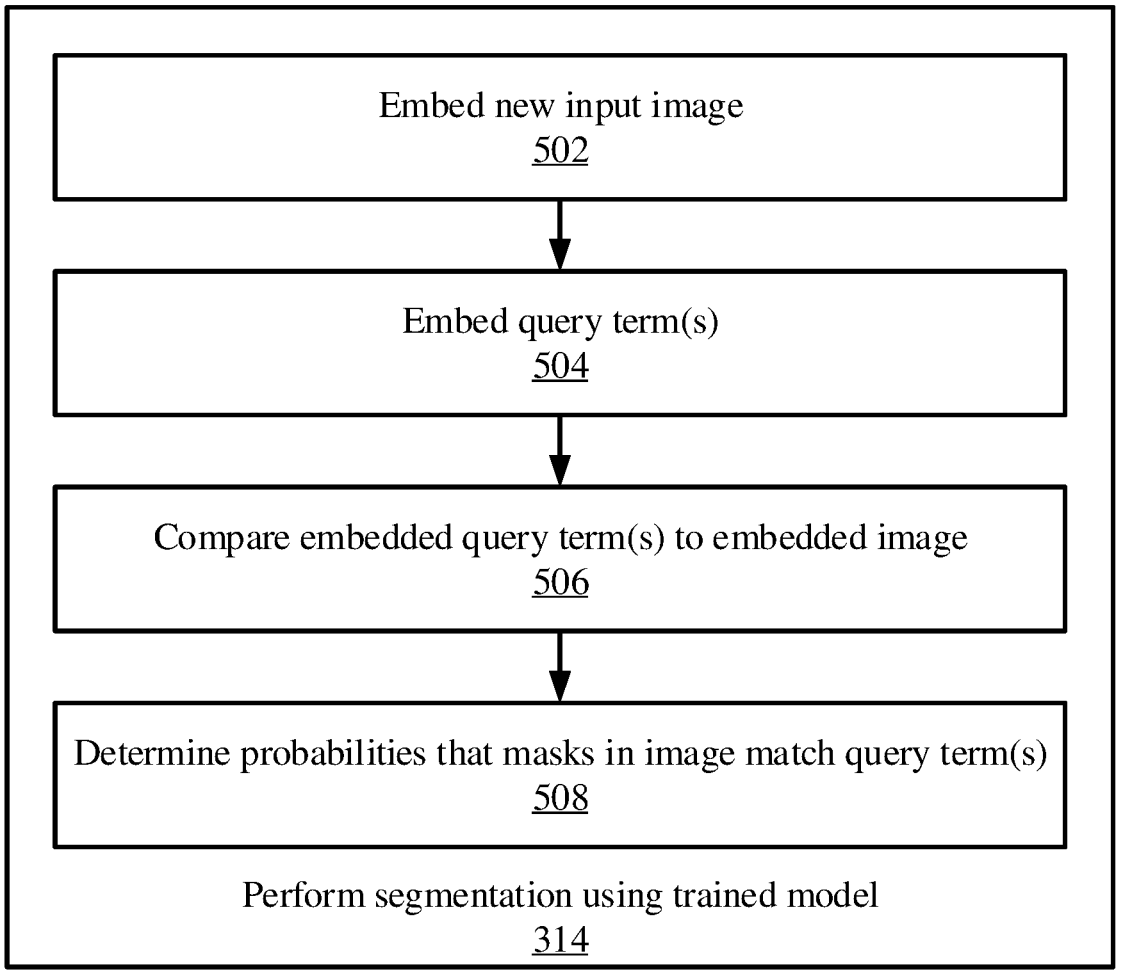
FIG. 5 is a block/flow diagram of a method of performing image segmentation using a trained image segmentation model having separate branches for embedding images and text inputs, in accordance with an embodiment of the present invention.

Referring now to FIG. 5, detail on performing segmentation using the trained model 314 is shown. During testing, the trained model is used to identify labels for objects in a new image. Given an image, the model predicts masks and, for each mask, an embedding vector. Thus, block 502 embeds a new input image using the trained model. A query may be provided with one or more textual query terms in block 506. To estimate a semantic category for each mask, the image's embedding vectors may be compared to a text embedding vector of the query in block 506. The text embedding vectors are the output of the text encoder, and the input to the text encoder are the class names of the query.

The text embeddings can change from the training to testing phases. For example, if the multiple datasets used in training include one hundred different categories, including "car" and "vehicle," the query may seek "bus" and "taxi." These texts may be input to the text encoder to derive corresponding embedding vectors. For each vector, the image embeddings may be compared to these new text embeddings to generate probabilities in block 508, for example showing the likelihood that each mask matches a bus or a taxi.

Figure 6:
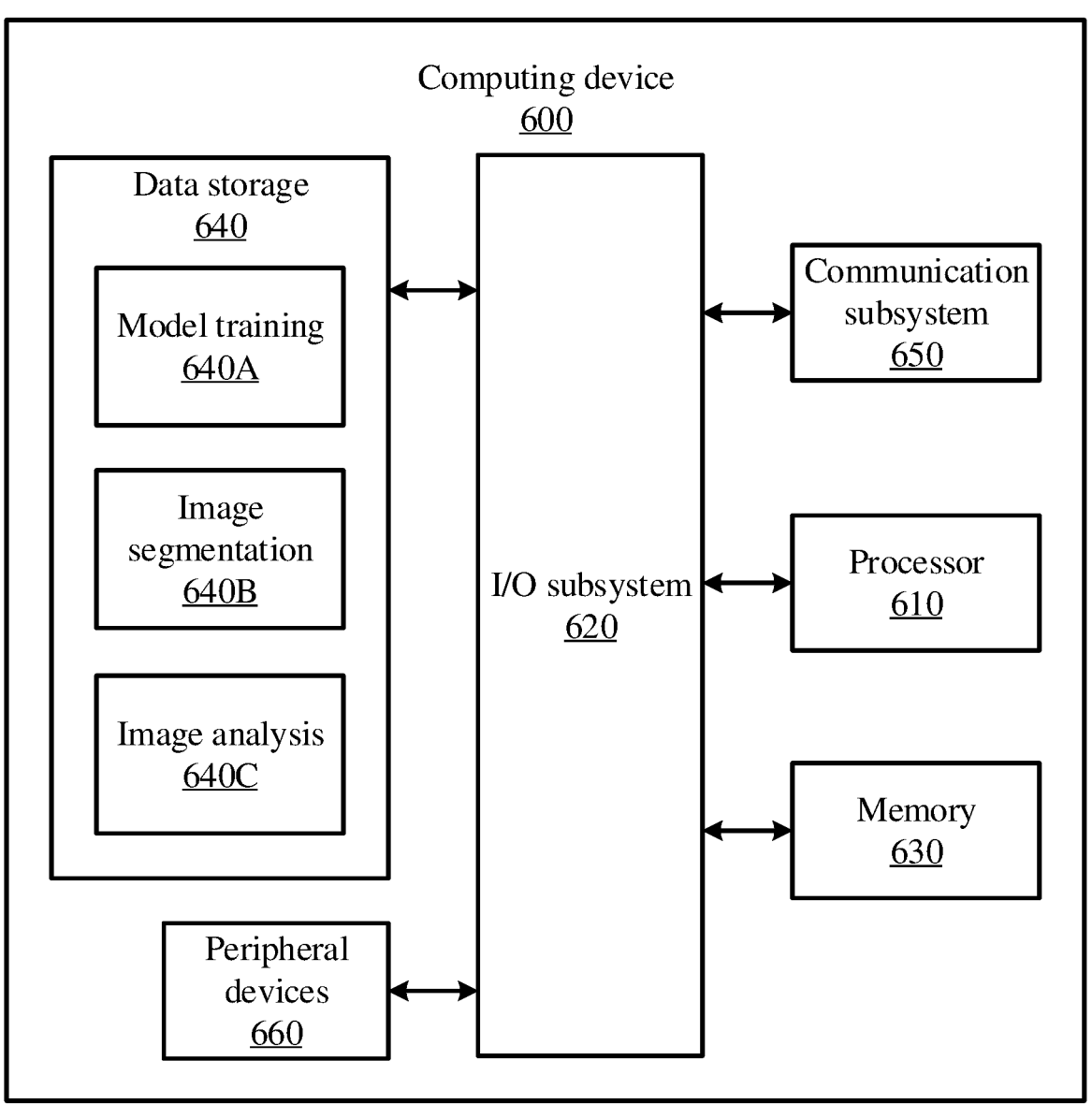
FIG. 6 is a block diagram of a computing device that is configured to perform model training, image segmentation, and image analysis, in accordance with an embodiment of the present invention.

As shown in FIG. 6, the computing device 600 illustratively includes the processor 610, an input/output subsystem 620, a memory 630, a data storage device 640, and a communication subsystem 650, and/or other components and devices commonly found in a server or similar computing device. The computing device 600 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 630, or portions thereof, may be incorporated in the processor 610 in some embodiments.

The processor 610 may be embodied as any type of processor capable of performing the functions described herein. The processor 610 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 630 may be embodied as any type of volatile or non-volatile memory or data storage capable of performing the functions described herein. In operation, the memory 630 may store various data and software used during operation of the computing device 600, such as operating systems, applications, programs, libraries, and drivers. The memory 630 is communicatively coupled to the processor 610 via the I/O subsystem 620, which may be embodied as circuitry and/or components to facilitate input/output operations with the processor 610, the memory 630, and other components of the computing device 600. For example, the I/O subsystem 620 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.), and/or other components and subsystems to facilitate the input/output operations. In some embodiments, the I/O subsystem 620 may form a portion of a system-on-a-chip (SOC) and be incorporated, along with the processor 610, the memory 630, and other components of the computing device 600, on a single integrated circuit chip.

The data storage device 640 may be embodied as any type of device or devices configured for short-term or long-term storage of data such as, for example, memory devices and circuits, memory cards, hard disk drives, solid state drives, or other data storage devices. The data storage device 640 can store program code 640A for training the image segmentation model, program code 640B for performing image segmentation using the trained model, and/or program code 640C for performing image analysis using a segmented image input. The communication subsystem 650 of the computing device 600 may be embodied as any network interface controller or other communication circuit, device, or collection thereof, capable of enabling communications between the computing device 600 and other remote devices over a network. The communication subsystem 650 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 600 may also include one or more peripheral devices 660. The peripheral devices 660 may include any number of additional input/output devices, interface devices, and/or other peripheral devices. For example, in some embodiments, the peripheral devices 660 may include a display, touch screen, graphics circuitry, keyboard, mouse, speaker system, microphone, network interface, and/or other input/output devices, interface devices, and/or peripheral devices.

Of course, the computing device 600 may also include other elements (not shown), as readily contemplated by one of skill in the art, as well as omit certain elements. For example, various other sensors, input devices, and/or output devices can be included in computing device 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 600 are readily contemplated by one of ordinary skill in the art given the teachings of the present invention provided herein.

Figure 7:
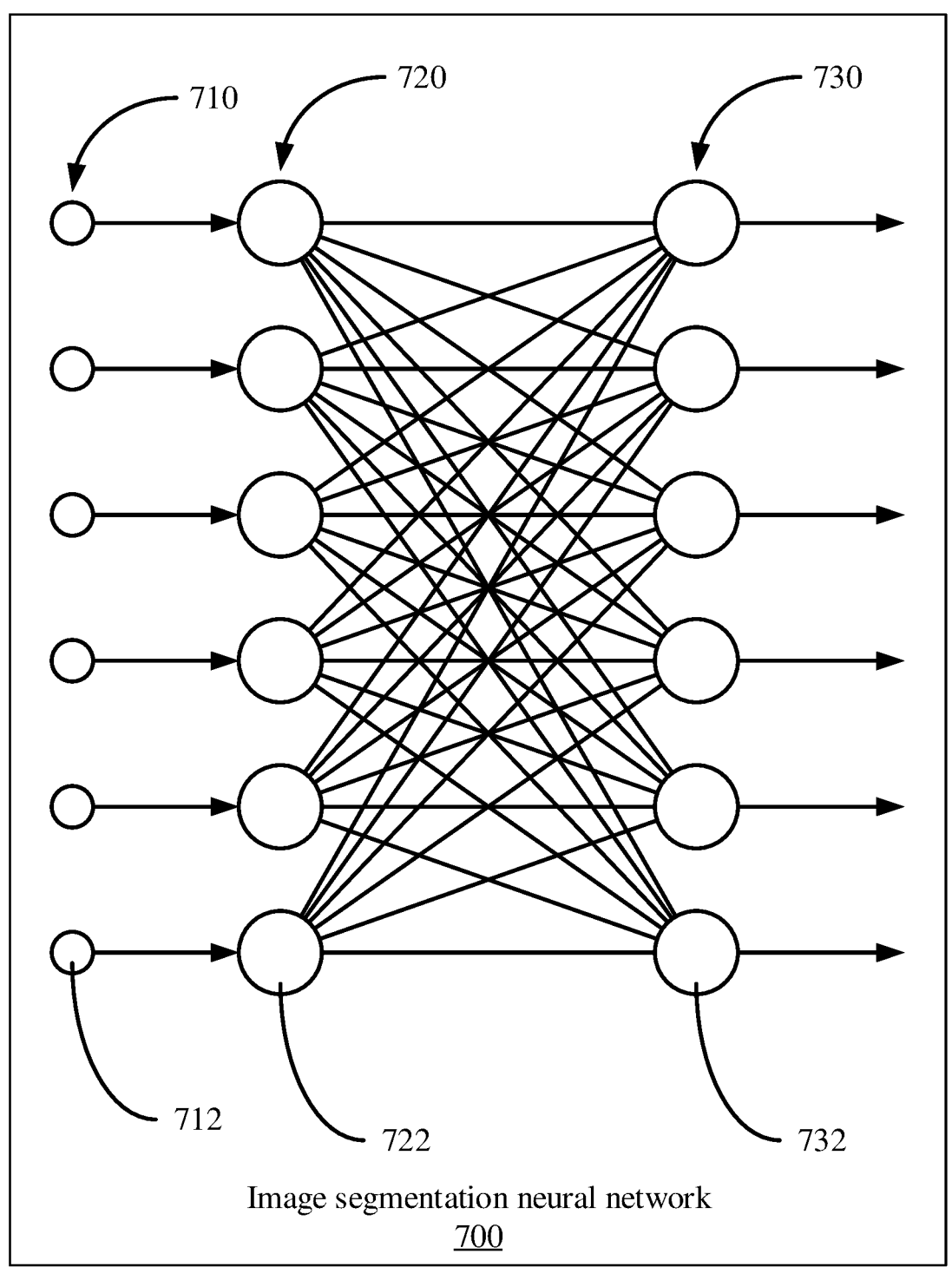
FIG. 7 is a diagram of an exemplary neural network architecture that may be used as part of an image segmentation model, in accordance with an embodiment of the present invention.
Figure 8:
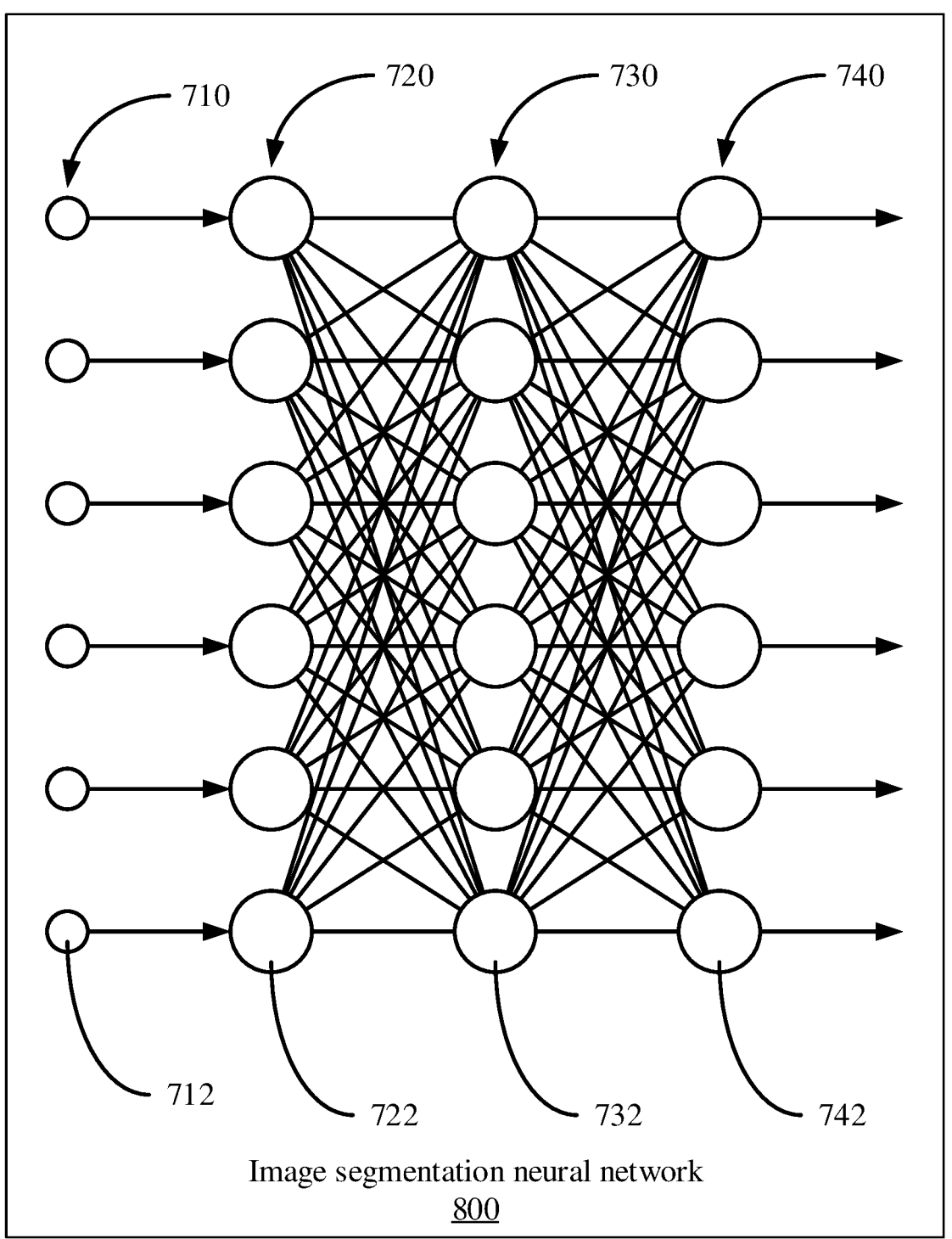
FIG. 8 is a diagram of an exemplary deep neural network architecture that may be used as part of an image segmentation model, in accordance with an embodiment of the present invention.

Referring now to FIGS. 7 and 8, exemplary neural network architectures are shown, which may be used to implement parts of the image segmentation neural network 700. A neural network is a generalized system that improves its functioning and accuracy through exposure to additional empirical data. The neural network becomes trained by exposure to the empirical data. During training, the neural network stores and adjusts a plurality of weights that are applied to the incoming empirical data. By applying the adjusted weights to the data, the data can be identified as belonging to a particular predefined class from a set of classes or a probability that the inputted data belongs to each of the classes can be outputted.

The empirical data, also known as training data, from a set of examples can be formatted as a string of values and fed into the input of the neural network. Each example may be associated with a known result or output. Each example can be represented as a pair, (x, y), where x represents the input data and y represents the known output. The input data may include a variety of different data types, and may include multiple distinct values. The network can have one input node for each value making up the example's input data, and a separate weight can be applied to each input value. The input data can, for example, be formatted as a vector, an array, or a string depending on the architecture of the neural network being constructed and trained.

The neural network "learns" by comparing the neural network output generated from the input data to the known values of the examples, and adjusting the stored weights to minimize the differences between the output values and the known values. The adjustments may be made to the stored weights through back propagation, where the effect of the weights on the output values may be determined by calculating the mathematical gradient and adjusting the weights in a manner that shifts the output towards a minimum difference. This optimization, referred to as a gradient descent approach, is a non-limiting example of how training may be performed. A subset of examples with known values that were not used for training can be used to test and validate the accuracy of the neural network.

During operation, the trained neural network can be used on new data that was not previously used in training or validation through generalization. The adjusted weights of the neural network can be applied to the new data, where the weights estimate a function developed from the training examples. The parameters of the estimated function which are captured by the weights are based on statistical inference.

In layered neural networks, nodes are arranged in the form of layers. An exemplary simple neural network has an input layer 720 of source nodes 722, and a single computation layer 730 having one or more computation nodes 732 that also act as output nodes, where there is a single computation node 732 for each possible category into which the input example could be classified. An input layer 720 can have a number of source nodes 722 equal to the number of data values 712 in the input data 710. The data values 712 in the input data 710 can be represented as a column vector. Each computation node 732 in the computation layer 730 generates a linear combination of weighted values from the input data 710 fed into input nodes 720, and applies a non-linear activation function that is differentiable to the sum. The exemplary simple neural network can perform classification on linearly separable examples (e.g., patterns).

A deep neural network, such as a multilayer perceptron, can have an input layer 720 of source nodes 722, one or more computation layer(s) 730 having one or more computation nodes 732, and an output layer 740, where there is a single output node 742 for each possible category into which the input example could be classified. An input layer 720 can have a number of source nodes 722 equal to the number of data values 712 in the input data 710. The computation nodes 732 in the computation layer(s) 730 can also be referred to as hidden layers, because they are between the source nodes 722 and output node(s) 742 and are not directly observed. Each node 732, 742 in a computation layer generates a linear combination of weighted values from the values output from the nodes in a previous layer, and applies a non-linear activation function that is differentiable over the range of the linear combination. The weights applied to the value from each previous node can be denoted, for example, by $w_1$, $w_2$, . . . , $w_{n-1}$, $w_n$. The output layer provides the overall response of the network to the inputted data. A deep neural network can be fully connected, where each node in a computational layer is connected to all other nodes in the previous layer, or may have other configurations of connections between layers. If links between nodes are missing, the network is referred to as partially connected.

Training a deep neural network can involve two phases, a forward phase where the weights of each node are fixed and the input propagates through the network, and a backwards phase where an error value is propagated backwards through the network and weight values are updated.

The computation nodes 732 in the one or more computation (hidden) layer(s) 730 perform a nonlinear transformation on the input data 712 that generates a feature space. The classes or categories may be more easily separated in the feature space than in the original data space.

11

Figure 9:
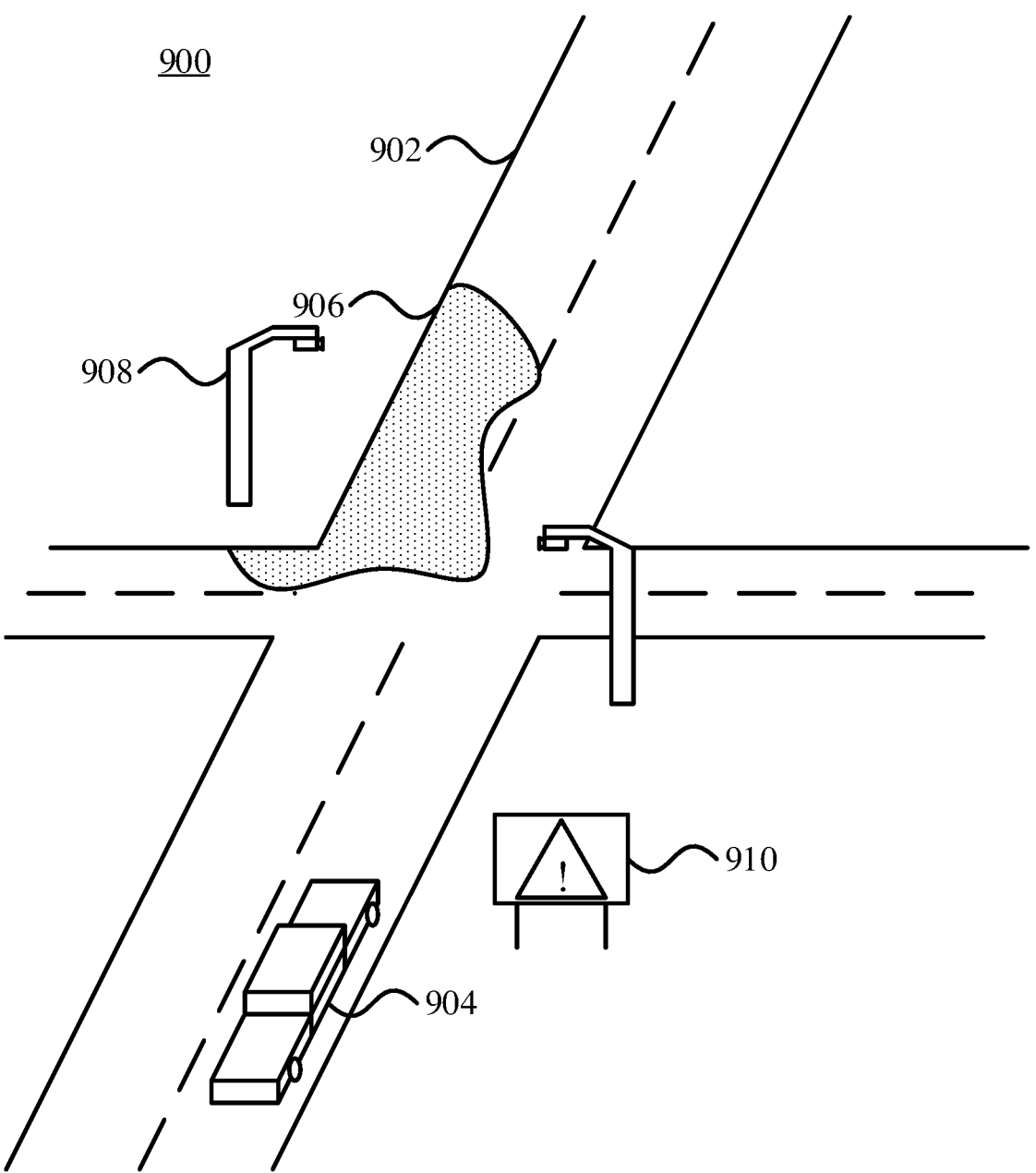
FIG. 9 is a diagram of a road scene that includes a hazard identified by a trained segmentation model, in accordance with an embodiment of the present invention.

Referring now to FIG. 9, an exemplary scene 900 is shown using a trained image segmentation model. The scene 900 illustrates roads 902 that have a road hazard 906. The road hazard 906 may be any type of obstruction or road condition, with exemplary road hazards including obstructions, such as debris, non-vehicle objects, or animals, and road conditions, such as road damage, water, snow, ice, or oil. The scene 900 may also include mobile objects, such as pedestrians and/or vehicles 904.

The scene 900 is monitored by one or more video cameras 908, which may be positioned on utility poles as illustrated to obtain an overhead perspective of the scene 900. Other positions for the video cameras 908 may include buildings, light poles, vehicles, and any other appropriate piece of local infrastructure. A panoptic image segmentation model may be used to identify features within the video feed, particularly with respect to the significance those features have for the safety of the scene 900. For example, identifying a road hazard 906 provides information that can be used to promote safety on the roads 902.

Information from the video cameras 908 may be processed locally or may be transmitted to a central location for panoptic image segmentation. Information about the scene 900 that is gleaned from the video cameras 908 may then be communicated to one or more locations. For example, information may be communicated to vehicles 904 on the roads 902 through on-board devices, to signage 910 for display, to pedestrians by audible broadcast, or to local authorities via a wired or wireless communication. For example, local authorities may be alerted to the road hazard 906, for example to summon firefighters, ambulances, or cleanup crews.

Figure 10:
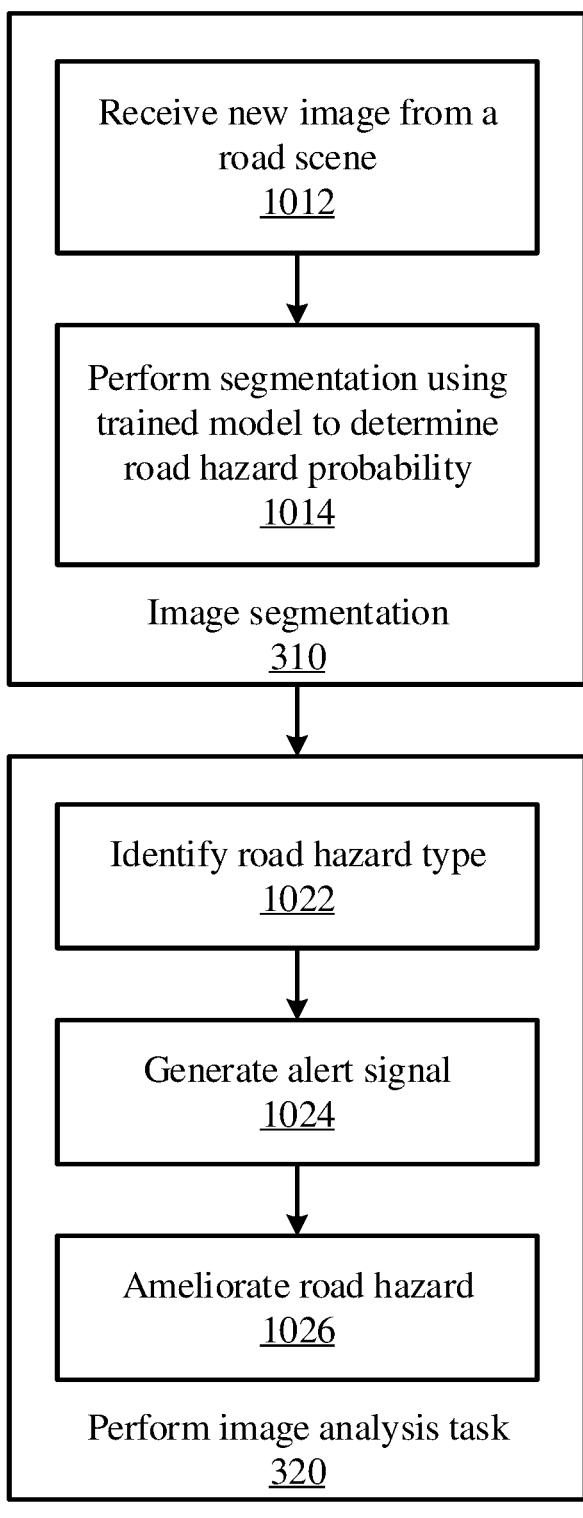
FIG. 10 is a block/flow diagram of a method for identifying road hazards, in accordance with an embodiment of the present invention.

Referring now to FIG. 10, a method for detecting and ameliorating a road hazard is shown. After a panoptic image segmentation model has been trained and deployed, image segmentation 310 is performed to identify the meaning of different parts of collected images. An image analysis task is performed 320 based on the identified masks within the image. Additional detail is provided on these steps in the particular example of deployment to monitor a road scene 900.

During image segmentation 310, a new image of a road scene 900 is acquired at block 1012, for example being generated by a camera 908 that overlooks the scene 900. Block 1014 then performs panoptic image segmentation using a trained model to identify masks within the image that correspond to different objects. Each of these masks may be assigned a probability corresponding to one or more different respective road hazards. The road hazards may be identified using textual inputs, such as "ice," "obstruction," "fire," or any other appropriate hazard or class of hazards. Each such probability may be based on a distance between an image embedding and a respective textual embedding of the road hazard.

Based on the output probabilities, image analysis 310 identifies a road hazard type and location in block 1022, for example by comparing the probability to a threshold value. Upon identifying a road hazard, block 1024 generates an alert signal to inform other systems and/or people about the existence and nature of the road hazard 906. For example, the alert signal may be sent to on-board systems of nearby vehicles 904, to roadside signage 910 for display, to connected audio projection systems, and/or to relevant authorities.

Block 1026 performs an action to ameliorate the road hazard. In some cases, the action may include displaying a warning to motorists so that they can safely avoid the road hazard 906. In some cases, the action may include automatically causing traffic control systems to reroute traffic away from the hazard, for example by changing the pattern of stoplights at nearby intersections. In some cases, the action may include summoning cleanup personnel to remove or correct the road hazard.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for identifying road hazards, comprising:
   capturing an image of a road scene using a camera;
   embedding the image using a segmentation model that includes an image branch having an image embedding layer that embeds images into a joint latent space and a text branch having a text embedding layer that embeds text into the joint latent space;
   generating a mask for an object within the image using the segmentation model;
   determining a probability that the object matches a road hazard using the segmentation mode; and
   generating a signal responsive to the probability to ameliorate a danger posed by the road hazard.

2. The method of claim 1, wherein the joint latent space represents a visual object and a textual description of visual objects as vectors that are similar to one another according to a distance metric.

3. The method of claim 2, wherein determining the probability includes comparing masks to known road hazards using a distance metric in the joint latent space.

4. The method of claim 3, wherein the known road hazards are represented in the joint latent space as embeddings of textual descriptions of the road hazards.

5. The method of claim 1, wherein the distance metric is a cosine distance.

6. The method of claim 1, wherein generating the mask includes identifying a location of the object in the image and generating a label for the object.

7. The method of claim 1, wherein generating the signal includes transmitting the signal to a system selected from the group consisting of a vehicle, roadside signage, and a municipal authority.

8. The method of claim 1, wherein generating the signal includes determining that the probability exceeds a threshold value to determine that the object shows a road hazard.

9. The method of claim 1, further comprising ameliorating the road hazard by performing an action selected from the group consisting of displaying a warning on roadside signage, audibly announcing the road hazard, and deploying a cleanup crew to correct the road hazard.

10. The method of claim 1, wherein the segmentation model is trained on a plurality of training datasets that include a panoptic segmentation dataset, which includes class labels for individual image pixels, and an object detection dataset, which includes a class label for a bounding box.

11. A system for identifying road hazards, comprising:
    a hardware processor; and
    a memory that stores a computer program which, when executed by the hardware processor, causes the hardware processor to:
    capture an image of a road scene using a camera;
    embed the image using a segmentation model that includes an image branch having an image embedding layer that embeds images into a joint latent space and a text branch having a text embedding layer that embeds text into the joint latent space;
    generate a mask for an object within the image using the segmentation model;
    determine a probability that the object matches a road hazard using the segmentation mode; and
    generate a signal responsive to the probability to ameliorate a danger posed by the road hazard.

12. The system of claim 11, wherein the joint latent space represents a visual object and a textual description of visual objects as vectors that are similar to one another according to a distance metric.

13. The system of claim 12, wherein the computer program further causes the hardware processor to determine compare masks to known road hazards using a distance metric in the joint latent space.

14. The system of claim 13, wherein the known road hazards are represented in the joint latent space as embeddings of textual descriptions of the road hazards.

15. The system of claim 11, wherein the distance metric is a cosine distance.

16. The system of claim 11, wherein the computer program further causes the hardware processor to identify a location of the object in the image and to generate a label for the object.

17. The system of claim 11, wherein the computer program further causes the hardware processor to transmit the signal to a system selected from the group consisting of a vehicle, roadside signage, and a municipal authority.

18. The system of claim 11, wherein the computer program further causes the hardware processor to determine that the probability exceeds a threshold value to determine that the object shows a road hazard.

19. The system of claim 11, wherein the computer program further causes the hardware processor to ameliorate the road hazard by performing an action selected from the group consisting of displaying a warning on roadside signage, audibly announcing the road hazard, and deploying a cleanup crew to correct the road hazard.

20. The system of claim 11, wherein the segmentation model is trained on a plurality of training datasets that include a panoptic segmentation dataset, which includes class labels for individual image pixels, and an object detection dataset, which includes a class label for a bounding box.

\* \* \* \* \*